United States Patent
Li

(10) Patent No.: US 11,366,775 B2
(45) Date of Patent: Jun. 21, 2022

(54) DATA STORAGE DEVICE WITH AN EXCLUSIVE CHANNEL FOR FLAG CHECKING OF READ DATA, AND NON-VOLATILE MEMORY CONTROL METHOD

(71) Applicant: Silicon Motion, Inc., Jhubei (TW)

(72) Inventor: An-Pang Li, New Taipei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 17/152,138

(22) Filed: Jan. 19, 2021

(65) Prior Publication Data
US 2021/0240642 A1    Aug. 5, 2021

(30) Foreign Application Priority Data
Feb. 3, 2020   (TW) .................................. 109103149

(51) Int. Cl.
*G06F 13/16* (2006.01)
*G06F 3/06* (2006.01)
*G06F 13/40* (2006.01)

(52) U.S. Cl.
CPC .......... *G06F 13/1668* (2013.01); *G06F 3/061* (2013.01); *G06F 3/0659* (2013.01); *G06F 3/0679* (2013.01); *G06F 13/4027* (2013.01)

(58) Field of Classification Search
CPC ............................. G06F 13/387; G06F 3/0617
See application file for complete search history.

(56) References Cited

U.S. PATENT DOCUMENTS

| | | | |
|---|---|---|---|
| 7,869,459 B2 | 1/2011 | Day et al. | |
| 8,527,983 B2* | 9/2013 | Teraya | G06F 9/4411 717/174 |
| 9,542,321 B2 | 1/2017 | Wu et al. | |
| 2003/0200375 A1* | 10/2003 | Kawaguchi | G06F 13/4031 710/309 |
| 2005/0044283 A1* | 2/2005 | Muro | G06F 13/387 710/8 |
| 2010/0023721 A1* | 1/2010 | Ito | G06F 12/0246 711/166 |
| 2010/0131692 A1* | 5/2010 | Nishizawa | G06F 13/4027 710/310 |
| 2019/0042096 A1* | 2/2019 | Anderson | G06F 3/0617 |
| 2019/0354305 A1 | 11/2019 | Pawlowski | |

* cited by examiner

*Primary Examiner* — Getente A Yimer
(74) *Attorney, Agent, or Firm* — McClure, Qualey & Rodack, LLP

(57) ABSTRACT

An efficient control technology for non-volatile memory. In a controller, a host bridge controller and a master computing unit are coupled to a system memory via an interconnect bus, and then coupled to a non-volatile memory interface controller. In response to a read command issued by a host, the non-volatile memory interface controller temporarily stores data read from a non-volatile memory to the system memory and, accordingly, asserts a flag in the system memory. Through a first channel provided by the interconnect bus, the host bridge controller confirms that the flag is asserted to correctly read the data from system memory and returns the data to the host. The master computing unit reads the system memory through a second channel provided by the interconnect bus, without being delayed by the status checking of the flag.

8 Claims, 5 Drawing Sheets

DATA STORAGE DEVICE WITH AN EXCLUSIVE CHANNEL FOR FLAG CHECKING OF READ DATA, AND NON-VOLATILE MEMORY CONTROL METHOD

CROSS REFERENCE TO RELATED APPLICATIONS

This application claims priority of Taiwan Patent Application No. 109103149, filed on Feb. 3, 2020, the entirety of which is incorporated by reference herein.

BACKGROUND OF THE INVENTION

Field of the Invention

The present invention relates to hardware design of a controller of a non-volatile memory.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

How to improve the performance of data storage device by hardware design is an important issue in the technical field.

BRIEF SUMMARY OF THE INVENTION

The present invention proposes an efficient control technology for non-volatile memory.

A data storage device in accordance with an exemplary embodiment of the present invention includes a non-volatile memory and a controller. The controller has a host bridge controller, a master computing unit, an interconnect bus, a system memory, and a non-volatile memory interface controller. The host bridge controller is coupled to a host, the non-volatile memory interface controller is coupled to the non-volatile memory, the host bridge controller and the master computing unit are coupled to the system memory through the interconnect bus, and the non-volatile memory interface controller is coupled between the system memory and the non-volatile memory. In response to a read command issued by the host, the non-volatile memory interface controller reads data from the non-volatile memory, temporarily stores the data in the system memory, and then asserts a flag corresponding to the data temporarily stored in the system memory. The host bridge controller checks the flag through a first channel provided by the interconnect bus, to read the data temporarily stored in the system memory according to the asserted flag. The master computing unit reads the system memory through a second channel provided by the interconnect bus.

In this way, the checking of the flag will not hinder the main computing unit to operate the system memory. The controller has high efficiency.

In an exemplary embodiment, the first channel provided by the interconnect bus is a write channel for the system memory, and the second channel provided by the interconnect bus is a read channel for the system memory.

The host bridge controller may execute a data detection command or a preset vendor command to issue a write request for programming a preset value. The write request for programming the preset value triggers a handshake between the host bridge controller and the system memory, and the handshake is transferred through the write channel. During the handshake, if programming of the preset value is permitted, the flag is deemed asserted, otherwise, the flag is deemed de-asserted.

In another exemplary embodiment, the host bridge controller executes a data detection command or a preset vendor command to issue a write request for programming data in a virtual address. The write request for programming data in the virtual address triggers a handshake between the host bridge controller and the system memory, and the handshake is transferred through the write channel. During the handshake, the status of the flag is obtained from system memory.

When determining that the flag is asserted, the host bridge controller reads the data from system memory through the read channel, and de-asserts the flag through the write channel.

The master computing unit can read the system memory through the read channel while the host bridge controller is checking the status of the flag through the write channel.

In an exemplary embodiment, the interconnect bus has a first slave input/output port, a second slave input/output port, and a master input/output port. The first slave input/output port is coupled to the master computing unit. The second slave input/output port is coupled to the host bridge controller. The master input/output port is coupled to the system memory. When the master computing unit gains the right to access the system memory, a read channel and a write channel are established between the first slave input/output port and the master input/output port. When the host bridge controller gains the right to access the system memory, a read channel and a write channel are established between the second slave input/output port and the master input/output port.

In another exemplary embodiment, the first channel provided by the interconnect bus is a flag reading channel corresponding to a flag area of the system memory, and the second channel provided by the interconnect bus is a data reading channel corresponding to a data area of the system memory. The interconnect bus further provides a flag writing channel corresponding to the flag area and a data writing channel corresponding to the data area.

The host bridge controller may access the system memory through the flag reading channel to check whether the flag is asserted or not. When determining that the flag is asserted, the host bridge controller reads the data temporarily stored in the system memory through the data reading channel, and de-asserts the flag through the flag writing channel.

The master computing unit can read the data area through the data reading channel or program the data area through the data writing channel while the host bridge controller is accessing the system memory through the flag reading channel to check whether the flag is asserted or not.

In an exemplary embodiment, the interconnect bus has a first slave input/output port, a second slave input/output port, a first master input/output port, and a second master input/output port. The first slave input/output port is coupled to the master computing unit. The second slave input/output port is coupled to the host bridge controller. When the master computing unit gains the right to access the system memory, a data reading channel and a data writing channel are established between the first slave input/output port and the first master input/output port. When the host bridge controller unit gains the right to access the system memory, a data reading channel and a data writing channel are established between the second slave input/output port and the first master input/output port, and a flag reading channel and a flag writing channel are established between the second slave input/output port and the second master input/output port.

The aforementioned controller may be implemented in other architectures. The foregoing concept can be used to implement a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
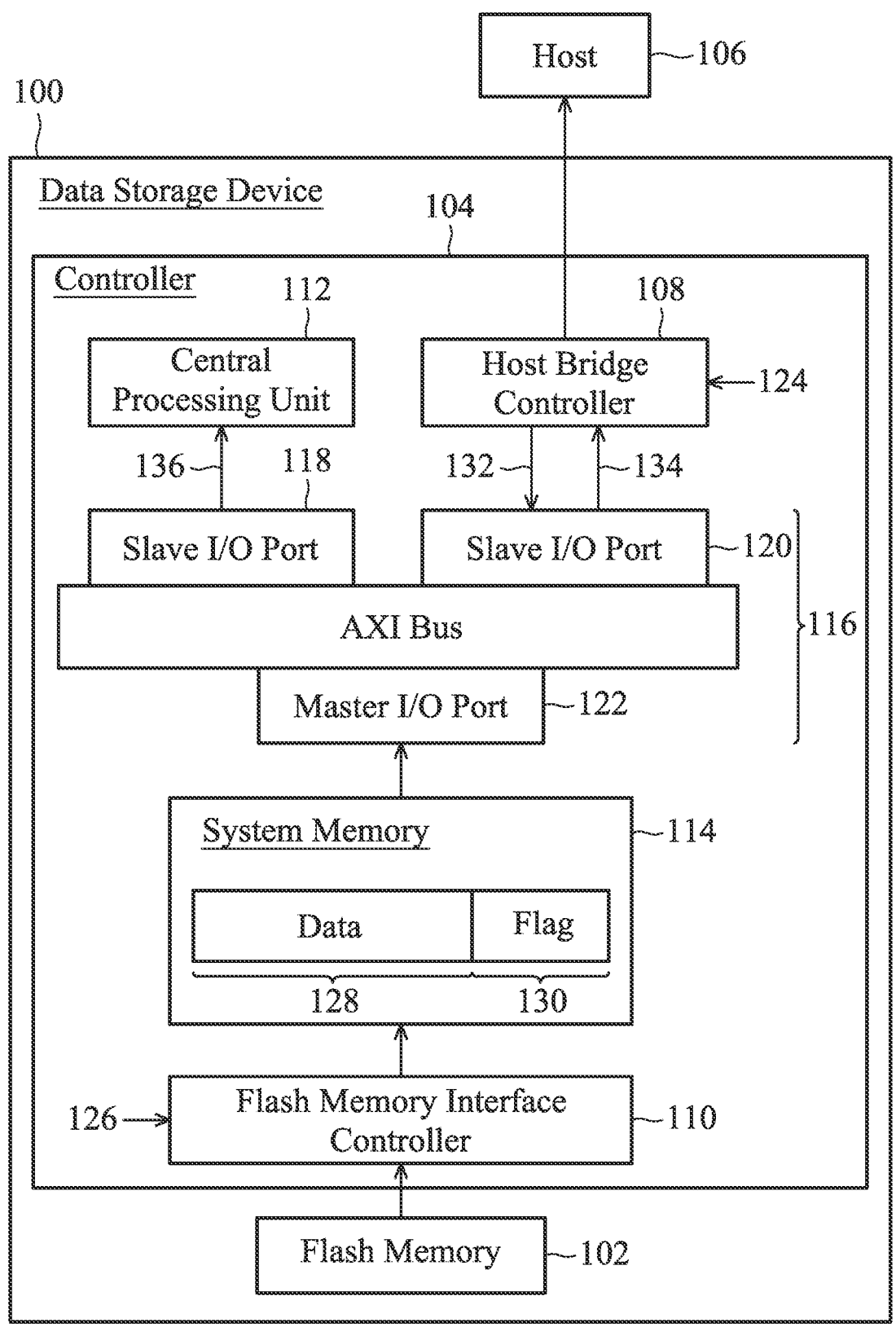
FIG. 1 is a block diagram depicting a data storage device 100 in accordance with an exemplary embodiment of the present invention.

FIG. 1 is a block diagram depicting a data storage device 100 in accordance with an exemplary embodiment of the present invention, including a flash memory 102 and a controller 104. The data storage device 100 operates according to commands issued by the host 106.

The controller 104 communicates with the host 106 through a host bridge controller 108, and is coupled to the flash memory 102 via a flash memory interface controller 110. The controller 104 includes a central processing unit 112, a system memory 114, and an advanced extensible interface (AXI) bus 116. The AXI bus 116 is an interconnect bus (or an on-chip bus) used to cope with the on-chip communication of the system-on-chip (SoC). The AXI bus 116 has two slave input/output (I/O) ports 118 and 120, and a master input/output port 122. The slave input/output port 118 is coupled to the central processing unit 112. The slave input/output port 120 is coupled to the host bridge controller 108. The master input/output port 122 is coupled to the system memory 114. Via the AXI bus 116, the host bridge controller 108 and the central processing unit 112 operate the system memory 114 to communicate with the flash memory interface controller 110.

Compared with the slave input/output ports 118 and 120, the host bridge controller 108 and the central processing unit 112 are playing the role of arithmetic logical units at the master end. Compared with the master input/output port 122, the system memory 114 is playing the role of a slave component. The host bridge controller 108 and the central processing unit 112 share the same channel, i.e., a read channel provided by the AXI bus 116, to read the system memory 114. In order to avoid conflicts in reading the system memory 114, the use right of the reading channel is assigned to the central processing unit 112 and the host bridge controller 108 in an interleaved way. As for the programming of the system memory 114, another channel (e.g., a write channel provided by the AXI bus 116) is required. The write channel and the read channel may transfer data in parallel. In another exemplary embodiment, the AXI bus 116 include more than one write channel and more than one read channel. For example, except the master input/output port 122, the AXI bus has additional master input/output ports, and thereby provides a plurality of write channels and a plurality of read channels. The write channels and the read channels may transfer data in parallel.

In FIG. 1, the example is about just using one single master input/output port 122. When the central processing unit 112 requests access to the system memory 114, the AXI bus 116 provides a read channel and a write channel between the slave input/output port 118 and the master input/output port 122. In another situation, when the host bridge controller 108 requests access to the system memory 114, the AXI bus 116 provides a read channel and a write channel between the slave input/output port 120 and the master input/output port 122.

In FIG. 1, the data flow corresponding to a read command requested by the host 106 is shown. In response to a read command issued by the host 106 and received by the controller 104, the central processing unit 112 outputs a trigger signal 124 to trigger the host bridge controller 108, and outputs another trigger signal 126 to trigger the flash memory interface controller 110. According to the trigger signal 126, the flash memory interface controller 110 activates direct memory access (DMA) to read the data requested by the read command from the flash memory 102 and write it into the system memory 114 as data 128. When the programming of data 128 into the system memory 114 is finished, the flash memory interface controller 110 asserts a flag 130 (e.g., set to "1") in the system memory 114 to show that the data 128 is readable. According to the trigger signal 124, the host bridge controller 108 (repeatedly) executes a data detection command or a preset vendor command for a handshake with the system memory 114 via the write channel provided by the AXI bus 116. Through the handshake, the host bridge controller 108 requests to program a preset value (referring to arrow 132) into the system memory 114. The write request to program the preset value works as a virtual write command, which is designed to determine whether the flag 130 has been asserted or not.

The virtual write command is discussed in this paragraph. When a preset value is allowed to be programmed into a system memory 114, it means that the flag 130 has been asserted. According to the asserted flag 130, the host bridge controller 108 reads the data 128 from system memory 114 through the read channel provided by the AXI bus 116 (referring to arrow 134). After reading the data 128, the host bridge controller 108 de-asserts (e.g., resets to "0") the flag 130 through the write channel provided by the AXI bus 116. The de-asserted flag 130 means that the data 128 can be overwritten or the storage space of data 128 can be released. When the preset value is not allowed to be programmed into the system memory 114, it means that the flag 130 has not been asserted. The host bridge controller 108 may repeatedly execute the forgoing data detection command or preset vendor command for handshake with the system memory 114 until the preset value is allowed to be programmed into the system memory 114.

In an exemplary embodiment, the data detection command or the vendor command is a write request for programming data in a virtual address, which activates the handshake (through the write channel provided by the AXI bus 116) between the host bridge controller 108 and the system memory 114. The status of the flag 130 is checked through the handshake.

In particular, in the forgoing process, the status of the flag 130 is checked through the write channel provided by the AXI bus 116 without occupying the read channel provided by the AXI bus 116. When the central processing unit 112 (or the other computing units playing the role of a master device) requests to read the system memory 114, the central processing unit 112 can immediately gain the right to use the read channel provided by the AXI bus 116 without competing with the checking request about the flag 130. The reading (referring to arrow 136) of the system memory 114 requested by the central processing unit 112 can be performed in parallel with the flag checking (referring to arrow 132) requested by the host bridge controller 108. The status checking of the flag 130 will not delay the central processing unit 112 to read the system memory 114. The central processing unit 112 reads the system memory 114 in the optimized manner. Therefore, the overall performance of the data storage device 100 is excellent.

Figure 2:
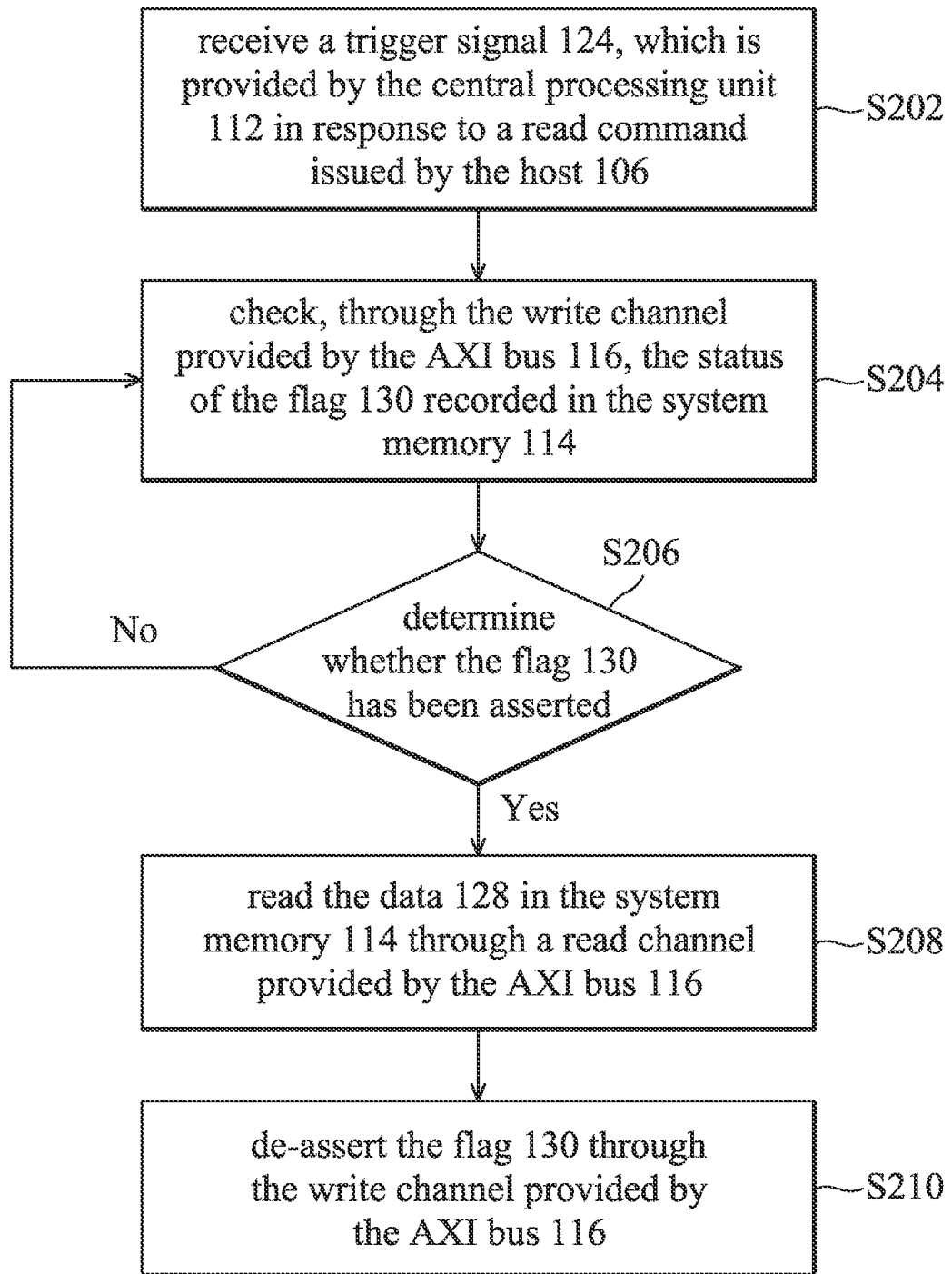
FIG. 2 is a flowchart illustrating how the host bridge controller 108 responds to a read command issued by the host 106 in accordance with an exemplary embodiment of the present invention.

FIG. 2 is a flowchart illustrating how the host bridge controller 108 responds to a read command issued by the host 106 in accordance with an exemplary embodiment of the present invention.

In step S202, a trigger signal 124 is received by the host bridge controller 108, wherein the trigger signal 124 is provided by the central processing unit 112 in response to a read command issued by the host 106. The read command preferably indicates the logical address of the read data (which will be temporarily stored in the system memory 114 as data 128), and the trigger signal 124 may further include information of a specified physical address of the system memory 114 which is specifically allocated for storage of the data 128.

In step S204, the status of the flag 130 recorded in the system memory 114 is checked through the write channel provided by the AXI bus 116. The host bridge controller 108 executes a data detection command or a preset vender command for handshake (through the write channel provided by the AXI bus 116) with the system memory 114. By checking whether it is allowed to program a preset value to the system memory 114 (referring to the data direction 132), the status of the flag 130 is determined.

In step S206, it is determined whether the flag 130 has been asserted. If yes, the procedure proceeds to step S208. If no, the procedure proceeds to step S204, and the handshake between the host bridge controller 108 and the system memory 114 is repeated to check the status of the flag 130. When the host bridge controller 108 is allowed to program the preset value to the flash memory 114 (referring to the data direction 132), it means that the flag 130 has been asserted, otherwise, the procedure returns to step S204.

In step S208, the data 128 in the system memory 114 is read by the host bridge controller 108 through a read channel provided by the AXI bus 116. The asserted flag 130 means that the flash memory interface controller 110 has stored the read data in the system memory 114 according to the specified physical address as the data 128. Through the read channel provided by the AXI bus 116, the host bridge controller 108 reads the system memory 114 according to the specified physical address and thereby obtains the data 128.

In step S210, the flag 130 is de-asserted by the host bridge controller 108 through the write channel provided by the AXI bus 116. When the data 128 is read successfully from system memory 114, the host bridge controller 108 de-asserts the flag 130 through the write channel provided by the AXI bus 116. The de-asserted flag 130 means that the reading of the data 128 is completed. The central processing unit 112 can recycle the storage space at the specified physical address that originally stores the data 128, or directly program another piece of data into the system memory 114 according to the specified physical address to overwrite the old data 128.

According to the techniques depicted in FIGS. 1 and 2, the central processing unit 112 can read the system memory 114 while the host bridge controller 108 is checking the flag 130. These two operations cane be performed in parallel.

Figure 3:
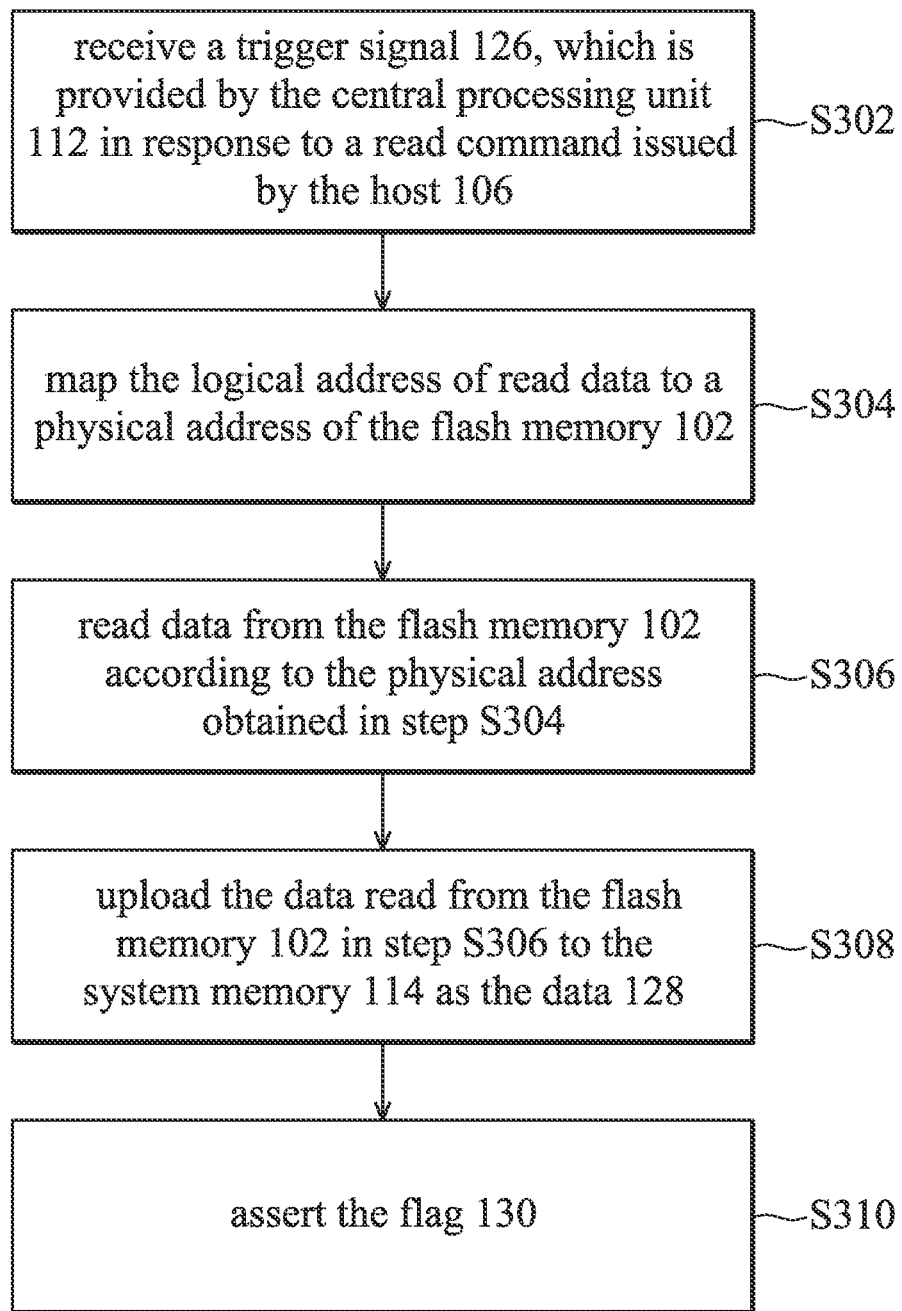
FIG. 3 is a flowchart illustrating how the flash memory interface controller 110 responds to a read command issued by the host 106 in accordance with an exemplary embodiment of the present invention.

FIG. 3 is a flowchart illustrating how the flash memory interface controller 110 responds to a read command issued by the host 106 in accordance with an exemplary embodiment of the present invention.

In step S302, a trigger signal 126 is received by the flash memory interface controller 110, wherein the trigger signal 126 is provided by the central processing unit 112 in response to a read command issued by the host 106. The trigger signal 126 may further include information about the logical address of the read data and the specified physical address of the system memory 114 allocated for the temporarily storage of read data (128).

In step S304, the logical address of read data is mapped to a physical address of the flash memory 102. The flash memory interface controller 110 looks up a logical-to-physical address mapping table to get a physical address of the flash memory 102 corresponding to the logical address of the read data.

In step S306, data is read from the flash memory 102 according to the physical address obtained in step S304. The flash memory interface controller 110 may read the flash memory 102 according to the physical address to get the read data.

In step S308, the data read from the flash memory 102 in step S306 is uploaded to the system memory 114 as the data 128. The flash memory interface controller 110 uploads the data read from the flash memory 102 in step S306 to the specified physical address of the system memory 114.

In step S310, the flag 130 is asserted. The flash memory interface controller 110 asserts the flag 130.

Before reading the data 128 from system memory 114, the host bridge controller 108 checks the status of the flag 130 through the write channel provided by the AXI bus 116. The write channel is different from the read channel that the AXI bus 116 provides for the central processing unit 112 to read the system memory 114. In this manner, the central processing unit 112 and the host bridge controller 108 can access the system memory 114 at the same time without causing operational conflicts. The purpose of the present invention is achieved.

Figure 4:
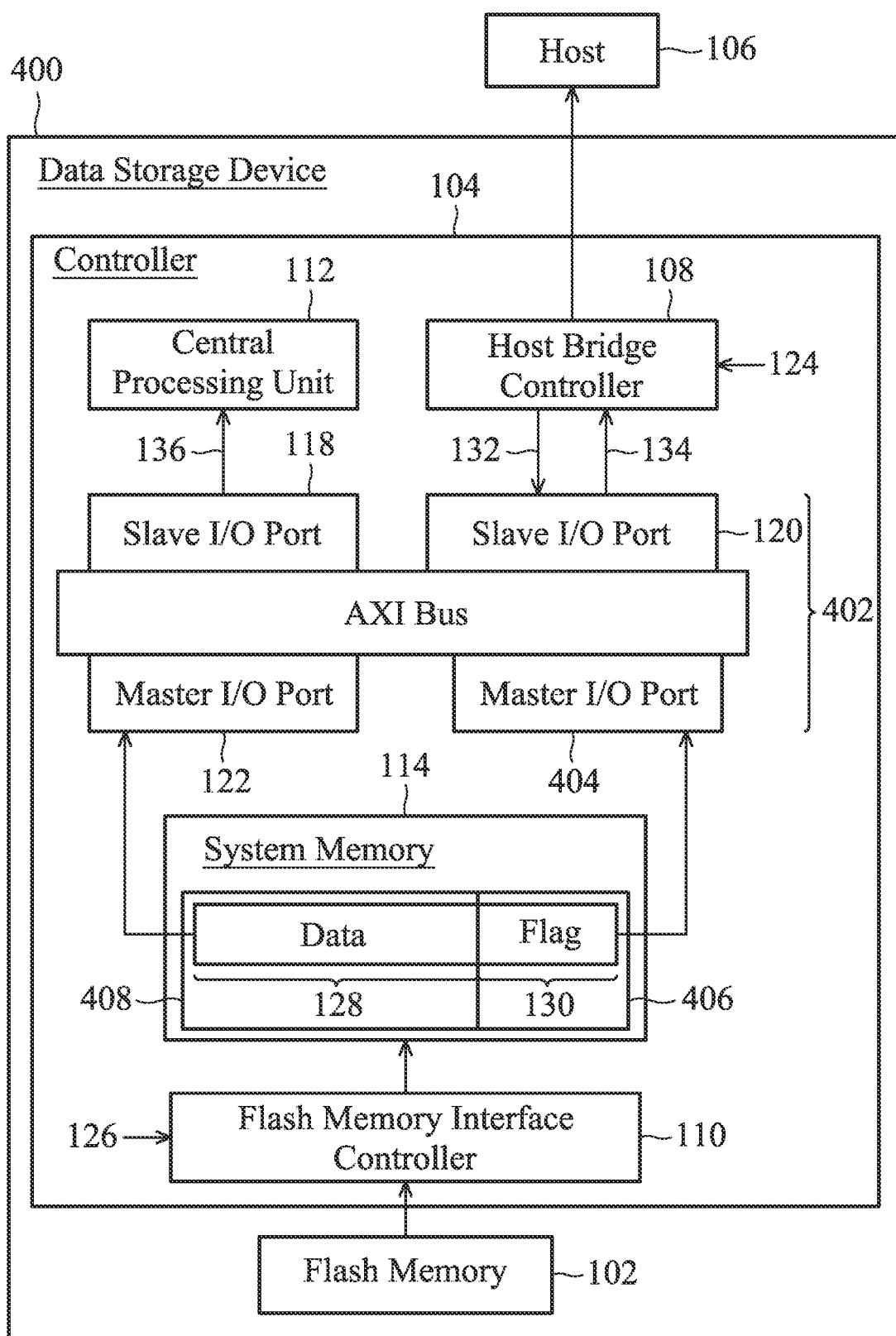
FIG. 4 illustrates a data storage device 400 in accordance with another exemplary embodiment of the present invention.

FIG. 4 illustrates a data storage device 400 in accordance with another exemplary embodiment of the present invention, which includes an AXI bus 402 that has two master input/output ports 122 and 404. The master input/output port 122 is coupled to the system memory 114 for the access of a data area 408. The master input/output port 404 is coupled to the system memory 114 for the access of a flag area 406. Because of the separated master input/output ports 122 and 404, the data area 408 and the flag area 406 can be accessed in parallel. The central processing unit 112 can read data from system memory 114 while the host bridge controller 108 is checking the flag 130. In this exemplary embodiment, the host bridge controller 108 checks whether the flag 130 has been asserted or not without executing any data detection command or preset vendor command.

In an exemplary embodiment, the AXI bus 402 provides a flag reading channel and a flag writing channel for the flag area 406, and provides a data reading channel and a data writing channel for the data area 408. When the central processing unit 112 requests access to the data area 408, data reading and writing channels are established between the slave input/output port 118 and the master input/output port 122. When the host bridge controller 108 requests access to the data area 408, data reading and writing channels are established between the slave input/output port 120 and the master input/output port 122. When the host bridge controller 108 requests access to the flag area 406, flag reading and writing channels are established between the slave input/output port 120 and the master input/output port 404.

In an exemplary embodiment, the central processing unit 112 can read/write the data area 408 through the data reading and writing channels established between the slave input/output port 118 and the master input/output port 122 while the status of the flag 130 is sent to the host bridge controller 108 via the master input/output port 404 and the slave input/output port 120. The central processing unit 112 can read and write the data area 408 without being delayed by the host bridge controller 108 that is reading or writing the flag area 406. Note that in the exemplary embodiment of FIG. 1, the central processing unit 112 cannot write data into the system memory 114 while the write channel provided by the AXI bus 116 is occupied with the status checking of the flag 130. However, in the example of FIG. 4, the status of the flag 130 is checked through an exclusive channel established for accessing the flag area 406. The central processing unit 112 can read the data area 408 while the host bridge controller 108 is checking the status of the flag 130.

Figure 5:
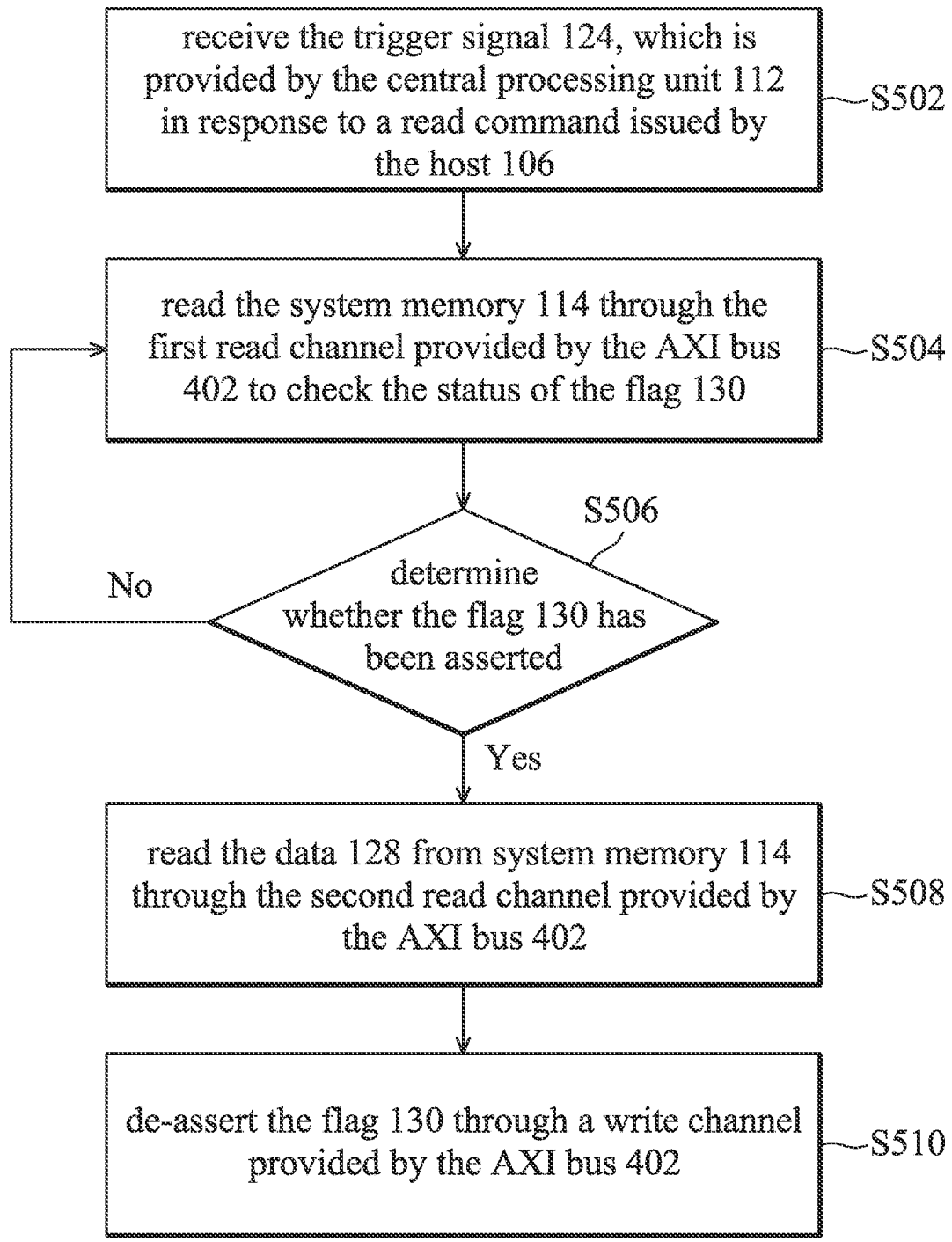
FIG. 5 is a flowchart depicting how the host bridge controller 108 operates in response to a read command issued by the host 106.

The flash memory interface controller 110 in the architecture of FIG. 4 may perform the same procedure depicted in FIG. 3 when the host 106 issues a read command. But, the host bridge controller 108 in the architecture of FIG. 4 may operate in a different way in response to the read command. FIG. 5 is a flowchart depicting how the host bridge controller 108 operates in response to a read command issued by the host 106.

In step S502, the host bridge controller 108 receives the trigger signal 124 that is provided by the central processing unit 112 in response to a read command issued by the host 106. The read command preferably indicates a logical address of the read data. The trigger signal 124 preferably indicates a specified physical address of the system memory 114 that is specifically allocated for temporary storage of the data 128.

In step S504, the host bridge controller 108 reads the system memory 114 through the first read channel provided by the AXI bus 402 to check the status of the flag 130. The host bridge controller 108 may read the flag area 406 of the system memory 114 to check the status of the flag 130 through the flag reading channel established between the slave input/output port 120 and the master input/output port 404. The flag reading channel is provided by the AXI bus 402 for the reading of the flag area 406.

In step S506, the host bridge controller 108 determines whether the flag 130 has been asserted. If yes, the procedure proceeds to step S508. If no, the procedure proceeds to step S504. The host bridge controller 108 repeats the checking of the flag 130.

In step S508, the host bridge controller 108 reads the data 128 from system memory 114 through the second read channel provided by the AXI bus 402. The asserted flag 130 means that the flash memory interface controller 110 finishes programming the data 128 into the specified physical address of the system memory 114. Through the data reading channel established by the AXI bus 402 between the slave input/output port 120 and the master input/output port 122 for the reading of the data area 408, the host bridge controller 108 reads the data 128 from the specified physical address of the system memory 114.

In step S510, the host bridge controller 108 de-asserts the flag 130 through a write channel provided by the AXI bus 402. Through the flag writing channel established by the AXI bus 402 between the slave input/output port 120 and the master input/output port 404 for the programming of the flag area 406, the host bridge controller 108 de-asserts the flag 130 in the flag area 130 of the system memory 114. The de-asserted flag 130 means that the reading of the data 128 has been finished. The central processing unit 112 can reuse the storage space at the specified physical address. Another piece of read data can be copied from the flash memory 102 and programmed into the system memory 114 according to the specified physical address.

The central processing unit 112 may read or write the data area 408 while the flag 130 is checked by the host bridge controller 108 (step S504).

The forgoing techniques that the controller 104 operates the flash memory 102 may be implemented in the other structures. Any technique providing an exclusive interconnect bus (or an on-chip bus), based on the aforementioned concepts, for checking a flag of data temporarily stored in a system memory should be regarded as within the scope of the present invention. The system memory can be read by another master computing unit without being delayed by the checking of the flag. Control methods based on the aforementioned concepts are also proposed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, having a host bridge controller, a master computing unit, an interconnect bus, a system memory, and a non-volatile memory interface controller, wherein:
the host bridge controller is coupled to a host, the non-volatile memory interface controller is coupled to the non-volatile memory, the host bridge controller and the master computing unit are coupled to the system memory through the interconnect bus, and the non-volatile memory interface controller is coupled between the system memory and the non-volatile memory;
in response to a read command issued by the host, the non-volatile memory interface controller reads data from the non-volatile memory, temporarily stores the data in the system memory, and then asserts a flag corresponding to the data temporarily stored in the system memory;
checking the flag through a first channel provided by the interconnect bus, the host bridge controller reads the data temporarily stored in the system memory according to the asserted flag; and
the master computing unit reads the system memory through a second channel provided by the interconnect bus, without being delayed by flag checking performed through the first channel,
wherein:
the first channel provided by the interconnect bus is a write channel for the system memory; and
the second channel provided by the interconnect bus is a read channel for the system memory,
the host bridge controller executes a data detection command or a preset vendor command to issue a write request for programming a preset value;
the write request for programming the preset value triggers a handshake between the host bridge controller and the system memory, and the handshake is transferred through the write channel; and
during the handshake, if programming of the preset value is permitted, the flag is deemed asserted, otherwise, the flag is deemed de-asserted.

2. The data storage device as claimed in claim 1, wherein:
when determining that the flag is asserted, the host bridge controller reads the data from system memory through the read channel, and de-asserts the flag through the write channel.

3. The data storage device as claimed in claim 2, wherein:
the master computing unit reads the system memory through the read channel while the host bridge controller is checking status of the flag through the write channel.

4. The data storage device as claimed in claim 3, wherein:
the interconnect bus has a first slave input and output (I/O) port, a second slave I/O port, and a master I/O port;
the first slave I/O port is coupled to the master computing unit;
the second slave I/O port is coupled to the host bridge controller;
the master I/O port is coupled to the system memory;
when the master computing unit gains right to access the system memory, the read channel and the write channel are established between the first slave I/O port and the master I/O port;
when the host bridge controller gains the right to access the system memory, the read channel and the write channel are established between the second slave I/O port and the master I/O port; and
in a design for the master computing unit to read the system memory through the read channel in parallel with the host bridge controller to perform the flag checking through the write channel, the read channel is established between the first slave I/O port and the master I/O port, and the write channel is established between the second slave I/O port and the master I/O port.

5. A non-volatile memory control method, comprising:
providing a host bridge controller coupled to a host, and providing a non-volatile memory interface controller coupled to a non-volatile memory;
coupling the host bridge controller and a master computing unit to a system memory through an interconnect bus, and coupling the system memory to the non-volatile memory interface controller;
in response to a read command issued by the host, triggering the non-volatile memory interface controller to read data from the non-volatile memory, to temporarily store the data in the system memory, and then assert a flag corresponding to the data temporarily stored in the system memory;
driving the host bridge controller to check the flag through a first channel provided by the interconnect bus, to read the data temporarily stored in the system memory according to the asserted flag; and
driving the master computing unit to read the system memory through a second channel provided by the interconnect bus, without being delayed by flag checking performed through the first channel,
wherein:
the first channel provided by the interconnect bus is a write channel for the system memory; and
the second channel provided by the interconnect bus is a read channel for the system memory,
the host bridge controller executes a data detection command or a preset vendor command to issue a write request for programming a preset value;
the write request for programming the preset value triggers a handshake between the host bridge controller and the system memory, and the handshake is transferred through the write channel; and
during the handshake, if programming of the preset value is permitted, the flag is deemed asserted, otherwise, the flag is deemed de-asserted.

6. The non-volatile memory control method as claimed in claim 5, wherein:
when determining that the flag is asserted, the host bridge controller reads the data from system memory through the read channel, and de-asserts the flag through the write channel.

7. The non-volatile memory control method as claimed in claim 6, wherein:
the master computing unit reads the system memory through the read channel while the host bridge controller is checking status of the flag through the write channel.

8. The non-volatile memory control method as claimed in claim 7, wherein:
the interconnect bus has a first slave I/O port, a second slave I/O port, and a master I/O port;
the first slave I/O port is coupled to the master computing unit;
the second slave I/O port is coupled to the host bridge controller;
the master I/O port is coupled to the system memory;
when the master computing unit gains right to access the system memory, the read channel and the write channel are established between the first slave I/O port and the master I/O port;
when the host bridge controller gains the right to access the system memory, the read channel and the write channel are established between the second slave I/O port and the master I/O port; and
in a design for the master computing unit to read the system memory through the read channel in parallel with the host bridge controller to perform the flag checking through the write channel, the read channel is established between the first slave I/O port and the master I/O port, and the write channel is established between the second slave I/O port and the master I/O port.

* * * * *